Feb. 28, 1928.

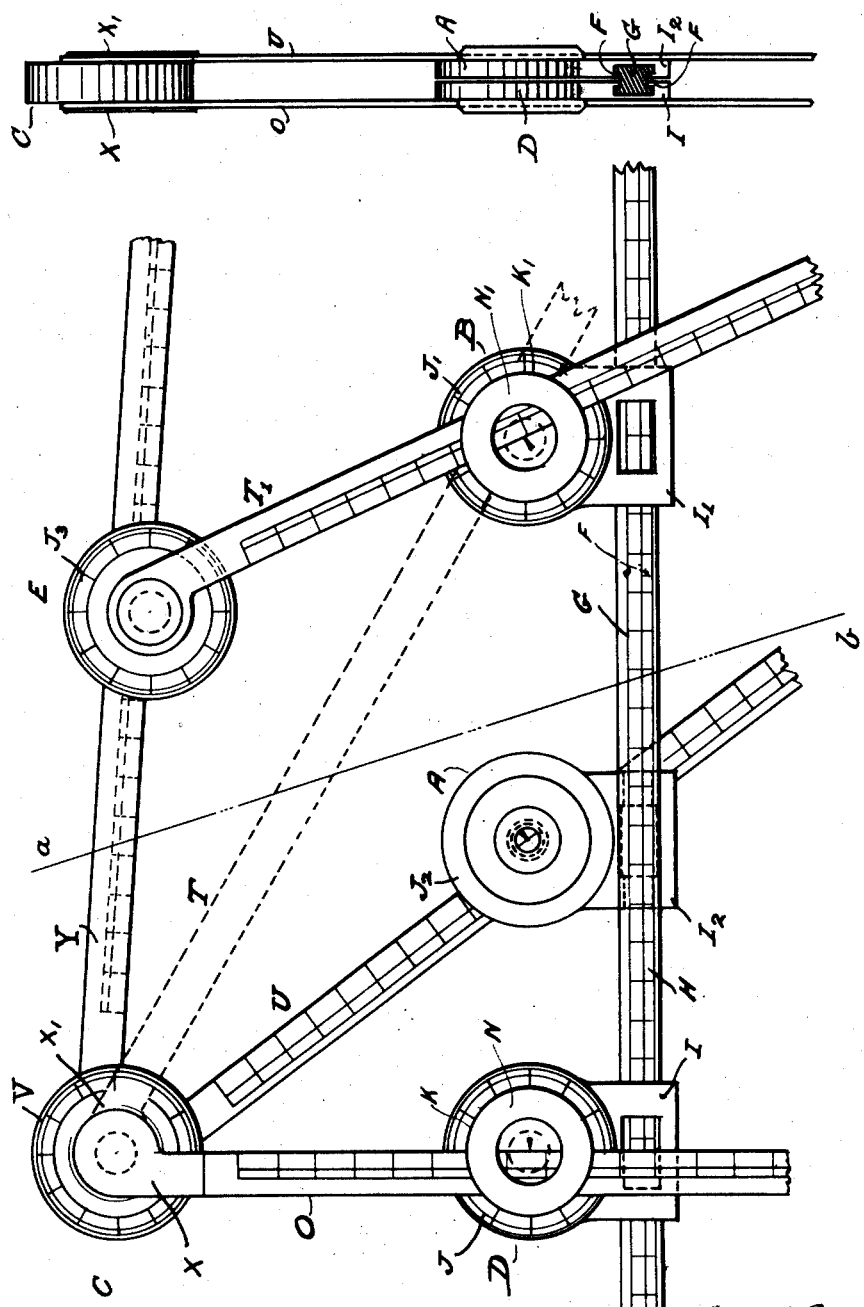

J. E. ROWE 1,661,096

MATHEMATICAL INSTRUMENT

Filed May 9, 1927    2 Sheets-Sheet 2

Inventor
Joseph Eugene Rowe
By Arthur Scrivenor.
Attorney

Patented Feb. 28, 1928.

1,661,096

UNITED STATES PATENT OFFICE.

JOSEPH EUGENE ROWE, OF WILLIAMSBURG, VIRGINIA.

MATHEMATICAL INSTRUMENT.

Application filed May 9, 1927. Serial No. 189,882.

My invention relates to instruments for solving mathematical problems, and for use in surveying, range finding, etc.; and the particular object of my invention is to provide an instrument by which plane triangles and polygonal figures may be rapidly and accurately solved, their areas and altitudes found, and arithemetrical operations depending upon the similarity of triangles rapidly performed.

My invention also comprises improvements in a similar invention described in my co-pending application filed May 1, 1926, Serial No. 106,044. In my application Serial No. 106,044, referred to, I have described and claimed my instrument as particularly designed for the solution of problems relating to triangles. In this application I describe my instrument as applied to the solution of problems relating to triangles and to quadrilateral figures. I also describe and claim particular forms of certain of the parts of my instrument.

It is further the object of my invention not only to simplify calculations in practical engineering, but also to simplify and humanize the teaching of mathematics.

Some of the uses of my instrument in practical engineering are the automatic solution of triangles in ordinary surveying; finding the area of any triangle as the product of the base and half altitude; the automatic solution of all sextant problems, such as finding the altitude and distance of a visible object; range finding both on land sea; and in the rapid solution of trigonometrical equations and the finding of the six trigonometric functions of any angle.

In simplifying the teaching of mathematics it enables one to combine the arts of plane geometry and trigonometry under one subject head, which I term trinometry; and in such a manner that any problem in geometry involving triangles may be presented by the instructor in a very attractive way; and so that the truth of the solution of a problem is at once seen by the student. With the use of my trinometer it will be possible to cover more ground in mathematics in a given time; and it will aid the student in acquiring in a shorter time a through understanding of the science.

Among the arithmetical operations which my trinometer may be used to perform are the multiplication of two numbers, the division of one number by another; extracting the square root of a number; and, in fact, many arithmetrical processes that can be made dependent upon similarity of triangles.

Figure 3:
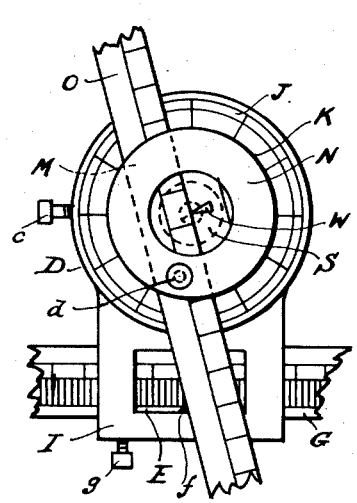
Figure 4:
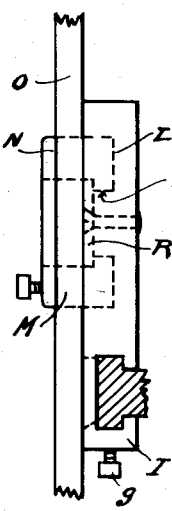
Figure 5:
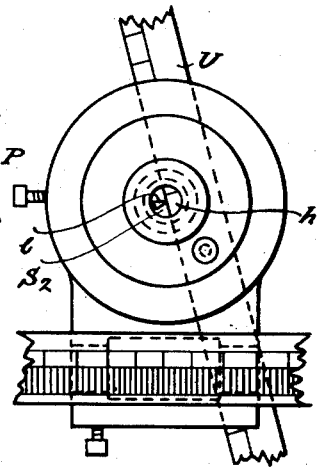
Figure 6:
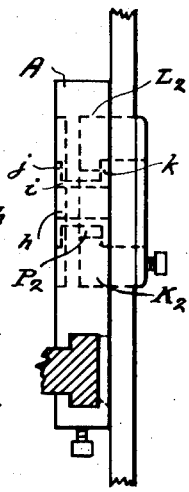
Figure 7:
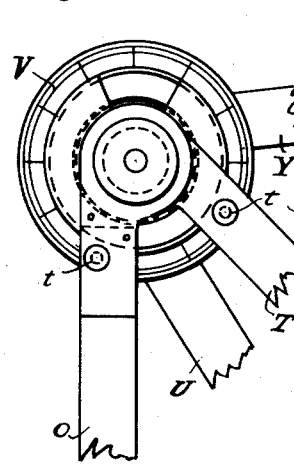
Figure 8:
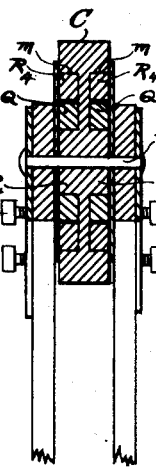
Figure 9:
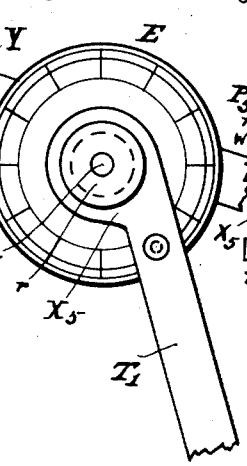
Figure 10:
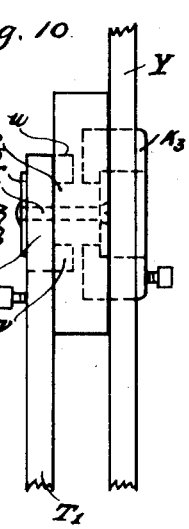

Referring to the drawings, which accompany and form a part of this specification: Figure 1 shows my instrument in front elevation. Figure 2 is a vertical section on line $a$—$b$ in Figure 1. Figure 3 shows in front elevation one of the sliding protractors of my instrument; and Figure 4 shows the same in side elevation. Figure 5 shows in front elevation another of the sliding protractors; and Figure 6 shows the same in side elevation. Figure 7 shows the pivot-head of my instrument in front elevation; and Figure 8 shows the same in vertical section. Figure 9 shows the field protractor of the instrument in front elevation; and Figure 10 shows the same in side elevation.

In Figure 1, G is a straight bar having in its top and bottom grooves F, F. The two vertical faces of the bar are graduated as at H; the graduations on the two sides being arranged opposite one another. Sliding upon the bar G, which for the sake of brevity I refer to as the base-bar, are the mechanisms D, B and A. These mechanisms consist of the bodies I, $I_1$, and $I_2$ respectively. The protractor scales J, $J_1$, $J_2$, respectively, are attached to or are marked on the bodies I, $I_1$, and $I_2$.

By referring to Figure 2 it will be seen that the bodies I, $I_1$, and $I_2$ are shaped to slide upon the base-bar G, and the each one has lugs on one face arranged to run in the grooves F, F in the top and bottom of the base-bar G. The mechanism A is arranged to slide on the rear side of the base-bar, while the mechanisms D and B are arranged to slide on the front of the base-bar.

Referring to the mechanisms D and B, revolving plates K and $K_1$ are pivoted in the centers of the respective protractors J and $J_1$. The plates K and $K_1$ are slotted to receive the scale-arms O and T. The construction of these two mechanisms is shown in detail in Figures 3 and 4.

In Figure 3, I is the body of the mechanism D; J is the protractor scale; K is the revolving plate which fits and revolves in the annular recess L in the upper part of the body I, and in which there is cut a slot M in which slides the scale-arm O. The slot is so located that one side of the scale-arm passes through the center of the protractor J. The scale-arm O is retained within the slot M by means of the cover plate N. The manner in which the plate K is pivoted on the body I is as follows:—In the bottom of the annular chamber L in the body I, and concentric with the said chamber, is the cylindrical boss P. The plate K is bored to neatly fit the boss P, and it can be revolved upon the boss P as center. The plate K is counterbored to a diameter greater than the diameter of the pivot P; the counterbore extending in depth as far as the top of the boss P. After the plate K has been adjusted on the pivot P, a keeper plate R is secured by means of a screw or other suitable fastening upon the end of the boss P. In this manner the plate K is held in place in the annular chamber L, and it is at the same time free to revolve upon the pivot P. I have found that the boss form of pivot is better than the pin form, as it may be fitted with greater accuracy, and the accuracy is more lasting.

Within the counterbore L of the plate K is fitted the block S; this block being located in the same plane as the slot M, and occupying but half of the counterbore, and adjacent to the slot M. Consequently the block S fits against the side of the scale-arm O when it is introduced into the slot M; and that edge of the block S which is adjacent to the scale-arm O passes directly through the center of the protractor J and the center of the pivot P. This center is marked upon the block S by the means of the spear-head W. The rotation of the plate K on the pivot P is controlled by means of the locking screw $c$, and the scale-arm is controlled in the slot M by means of the locking screw $d$.

The lower part of the body I slides upon the base-bar G; and in the face of the lower body I there is cut an opening E through which the scale on the base-bar G may be read. The vertical line passing through the center of the protractor J and pivot P, and normal to the base-bar G, is marked on the edge of the opening E by the spear-head $f$. The position of the body I on the base-bar G is secured by means of the locking screw $g$. It will now be understood that the mechanism D can be slid along the base-bar G; and that the graduated edge of the scale-arm O can be passed through the center of the protractor J, and that it may also be rotated around the same center so as to change its angularity with reference to the base-bar.

Referring again to Figure 1, the mechanism B is similar to the mechanism D; but in mechanism B the plate $K_1$ has been revolved through about 180 degrees so that the scale-arm $T_1$ passes to the right of the center of the protractor, instead of to the left as in the case of mechanism D and scale-arm O. Between the mechanisms B and D is located the mechanism A, which is arranged to slide upon the side of the bar opposite to that on which B and D slide. The object of mounting these mechanisms on opposite sides of base-bar G is so that the mechanism A can pass either the mechanism B or the mechanism D.

The mechanism A is shown in detail in Figures 5 and 6. The general design of this mechanism is similar to that of mechanisms B and D; but as the mechanism A runs upon the opposite side of the base-bar it is more convenient to graduate its rear face; in consequence of which the instrument is usually turned around to read the position of the mechanism A on the base-bar G, and the position of the scale-arm U with reference to the base-bar, and also with reference to the center of the protractor $J_2$. But it is convenient sometimes to be able to note approximately the position of the scale-arm U with reference to the center of the protractor $J_2$ without turning the instrument around; and for this purpose I bore a hole $h$ completely through the pivot $P_2$, and I pass a bushing $i$ through this hole. One end of the bushing terminates in the flange $j$, and the other end in the flange $k$. These flanges hold the bushing in place, and also the plate $K_2$ within the counter bore $L_2$. It is now possible to see the back of the scale-arm U and the spearhead $l$ on the back of the block $S_2$, through the hole in the bushing $i$.

In Figures 7 and 8 there is shown the pivot-head C on which the scale-arms O, U and T and Y are pivoted; the scale-arms O and T being pivoted upon the front side, and the scale-arms U and Y being pivoted upon the rear of the head C. Upon each side of the head C is a circular scale V. The manner in which the two pairs of scale-arms is pivoted is similar. On each face of the head C is sunk the annular grooves $m$, $m$, leaving the pivot bosses $P_4$. Fitted to and revolvable around these pivot bosses are the rings Q and $R_4$. Referring to one side of the head C: The scale-arm T is secured to the inner ring Q, while the scale-arm O is secured to the outer ring $R_4$. The centers of the heads of the two scale-arms O and T are now pivoted on the center of the protractor scale V. The scale-arms U and Y being pivoted in the same way on the rear side of the head C, the four scale-arms are secured in place by means of the bolt or rivet $n$. The positions of each of the scale-arms O, U, T and Y, with reference to one another can be read off the protractor scales V. The positions of the four scale-arms with reference to the protractor V are controlled by means of the locking screws $t$.

In Figures 9 and 10 there is shown the field protractor E. On the back of this field protractor, as it is viewed in Figure 1, there is fitted a revolving plate $K_3$ similar to the revolving plates $K$ and $K_1$ on mechanisms D and B. Through the slot in the revolving plate $K_3$ slides the scale-arm Y. On the front face of the field protractor E is pivoted the scale-arm $T_1$. In this case also I find it better to pivot the scale-arm upon a large pivot or boss rather than upon one of the pin type. On the front of the body of mechanism E, I turn the annular groove $u$, leaving the pivot-boss $P_5$. On the back of the head $X_5$ of the scale-arm $T_1$ I secure a ring $v$, which ring fits into the annular groove $u$. The screw $w$ holds in place the cover plate $r$, and also the head $X_5$ of the scale-arm $T_1$.

We now see that we can read on the protractors D, A, B the angular relations between the scale-arms O, U, and T with the base-bar G; and also the distances from the center of the protractors D, A and B to the center of the pivot-head C. On the protractor scale V on the pivot-head C we can read the angular relations between these three arms. It will also be seen that we can read the distance between the center of the field protractor E and the center of the head protractor V on the scale-arm Y; and we can read the distance from the center of the field protractor E to the center of the protractor $J_1$ on mechanism B on the scale-arm $T_1$. We can also read the angular relations between scale-arms Y and $T_1$ on the protractor $J_3$. For most purposes the head of the scale-arm $T_1$ may be fixed on the field protractor E so that it does not rotate. The angular movement between Y and $T_1$ is then provided by the revolving plate $K_3$ (see Figure 10).

In Figure 1 I have shown the scale-arm T, which corresponds to the scale-arm T in my co-pending application, Serial No. 106,044, in dotted lines. When I use the instrument described in this application for the solution of triangles, I use the base-bar G, the mechanisms A, B, C and D and the scale-arms O, U and T. I have omitted verniers for the sake of simplicity. In fact in the simpler forms of my instrument I secure sufficient accuracy to make verniers unnecessary.

In describing the use of my instrument it will be convenient to designate the center of the protractor V as C, the center of the protractor J as D, the center of the protractor $J_2$ as A, the center of the protractor $J_1$ as B, and the center of the protractor $J_3$ as E. Referring to Figure 1: we then have a triangle DCB, with the base DB; a triangle DCA, with base DA; and a triangle ACB, with base AB; and we also have another triangle CBE, and the quadrilateral figures CEBD and CEBA, and with a diagonal through CB.

To measure the altitude and the area of triangle ACB, and to determine the three angles, the three sides having been given: the scale-arm U is slid through the mechanism A until the distance CA is equivalent to the length of a side of the triangle; the scale-arm T is slid through mechanism B until CB is equivalent to the length of the other side of the triangle; mechanism B is slid along the base-bar until AB is equivalent to the length of the base of the triangle. We now have the triangle with the three given sides; and we can read the angle ACB on protractor V, the angle ABC on protractor $J_1$ and angle CAB on protractor $J_2$. The mechanism D is now slid on the base-bar until protractor J reads 90 degrees, when the arm O will be at right angles to the base-bar G, and to DB. The reading CD on scale-arm O is then the equivalent of the altitude; and the area of the triangle CAB equals $AB \times CD/2$.

If the triangle CAB has three acute angles the altitude CD will intersect the base AB. In constructing the triangle CAB the mechanism D will slide along the base-bar G past the mechanism A until it lies at a point on the base-bar between A and B.

In constructing similar right triangles we can proceed in two ways. If the scale-arm U is used as the common side, it is swung until the arm U reads on 90 degrees of the protractor $J_2$. The arm U is then slid through mechanism A until CA is equivalent to the length of the side common to the two triangles. If the bases of the two similar triangles are given, then the mechanisms D and B are slid on the base-bar, D to the left and B to the right, until DA and AB are equivalent to the lengths of the two bases. CD and CB will then be equivalent to the lengths of the two hypothenuses; and we can read the several acute angles on protractors V, J, and $J_1$.

If the angles of similar triangles are given, we may select one of the scale-arms, as U, for the common side, and set the protractor $J_2$ to read the angles enclosed by the common side, and the bases. We then set mechanism D away from mechanism A a distance so that DA will equal the length of one of the bases to any assumed scale. Scale-arm U is now slid through mechanism A until angle CDA equals the angle to be enclosed by base DA and side DC. Similarly, mechanism B is slid away from A until the angle CBA is equal to the angle to be enclosed by base AB and the side BC. The angles DCA and BCA may then be read on protractor V; and the lengths of the sides DC, and BC, and AC, may be read on scale-arms O, T and U respectively, and the lengths of the two bases on scale H, to the scale selected when assuming the length of the base DA.

Another example in similar triangles, the angles CAB of one triangle being given, may be constructed as follows. Slide arm U through mechanism A to make CA of any length, and forming given angle CAB with the base line through DAB. Swing arm T on pivot C to form given angle ACB; read on protractor V. As arm T is swung on C mechanism B will slide to its place on base-bar G forming base AB and the remaining given angle ABC. Now swing arm O on pivot C, at the same time sliding mechanism D on base-bar G, until the sum of the readings of protractor V equals the reading of angle CAB on protractor $J_2$. Angle CDB will then be equal to angle ACB, which is true because angle DBC is common to the similar triangles CAB and DCB.

If it be required to find the height of and the distance of an inaccessible object, the summit of which we will designate as $S_3$; loosen all clamping screws on the instrument, and place the bar G in a horizontal position (which may be checked with a bubble), with the scale-arms O, U, T in a vertical plane. Sight on $S_3$ over the edge of arm U. Move a convenient distance back to a second point of observation, and slide mechanism B along the base-bar G so that AB will be equivalent to the distance between the two points of observation. Slide U through protractor $J_2$; and at the same time slide arm T in protractor $J_1$, and also rotate T about B, until $S_3$ is sighted along the edge of arm T. This gives us the triangle ABC. Now slide mechanism D along the base-bar G, allowing arm O to pivot on C and also to slide in mechanism D, until arm O is perpendicular to the base-bar G, reading on protractor J. Then CD is the height of the distant object; and AD and BD are its horizontal distances from the first and second points of observation, respectively. For convenience in sighting, sights of equal height may be clipped onto the arms U and T; and for extreme accuracy in the field telescopic sights may be used in the same way. The positions of the mechanisms on the base-bar, of the scale-arms in the mechanisms and of the scale-arms around the pivots, may be secured by means of clamps. These are optional. In the foregoing descriptions scale-arm O has been used for measuring altitudes, and the scale-arm U for sides common to triangles, and so on; but since each one of the three mechanisms D, B, A are slidable along the base-bar G, and since mechanism A can pass mechanism D and B, it is evident that any one of these scale-arms may be used for measuring altitudes, or for the sides common to similar triangles.

From the foregoing descriptions of solutions of triangles on my trinometer, it will be seen that other problems may be solved. For instance: the solution of a triangle, having given two sides and the included angle, or two angles and the included side; or three sides and the angle opposite one of them.

To illustrate the extraction of a square root, of any number, $n$, set arm U at right angles to DAB, slide mechanism B until AB is equal to $n$. Then slide mechanism D until AD is equal to unity, to the same scale as $n$. With these two lengths now fixed, slide arm U through mechanism A until the angle DCB is 90 degrees. Then the length AC is the desired square root; for, by similar triangles, $AC^2 = AB \times AD = n \times 1$; and therefore $AC = \sqrt{n}$. To square a number $n$, the arm U is adjusted to make AC equal to $n$, and AD is made equal to unity to the same scale; then swing T on pivot C until DCB is 90 degrees. Then AB is equal to $n^2$; for, by similar triangles $1 \times AB = AC^2$, or $AB = n^2$.

The natural trigonometrical functions of all acute angles may also be found on the trinometer. To illustrate: swing arm U to the 90 degree position. Make BC equal to any tens of units by sliding arm T in mechanism B. Angle CAB and side BC are now fixed. Now form different values of angle ABC by sliding arm U in mechanism A, at the same time sliding mechanism B along the base-bar. For each value of angle ABC, AC and AB will give the values of the corresponding sine and cosine, respectively. To obtain tangents and secants; fix AB equal to any tens of units, and set U at right angles to AB. Obtain different angles ABC by sliding arm U in mechanism A, and by sliding arm T in mechanism B, at the same time rotating arm T on pivot C and about B. For each value of angle ABC, AC will give the tangent, and BC the secant of angle ABC. To obtain cotangents and cosecants; fix AC equal to any tens of units. Slide mechanism B on the base-bar to form angles ABC, at the same time allowing arm T to slide through mechanism B. Then for each value of angle ABC, AB is the cotangent, and BC is the cosecant, of the angle ABC.

In the description of some of the uses of my trinometer I have generally used the arm O to measure altitude of triangles. So also may either of the arms U and T be used to measure altitudes. For instance O is used to measure the altitude of a triangle ABC; U to measure the altitude of a triangle DBC; and T to measure the altitude of a triangle DAC.

Assuming that I now wish to solve a problem relating to a quadrilateral figure, I remove the scale-arm T from the mechanism B, and swing it out of the way; or it may, if preferred, be removed from the instrument. I then pass the scale-arm $T_1$, which is pivoted to mechanism E, through the groove in the plate $K_1$ on mechanism B. I then pass the scale-arm Y, which is pivoted to the rear of the head C, through the groove in the plate $K_3$ on the rear of the mechanism E. I then have a quadrilateral figure whose angles are located at the centers of the pivots of the mechanisms B, D, C and E. If in the solution of any problems a diagonal is desired, the mechanism A is slid along the base-bar G until it is exactly behind the mechanism B. The scale-arm U then forms a diagonal of the quadrilateral figure C E B D.

A triangle, or any geometric figure, is bounded by lines; not by members having breadth and thickness. The parts of an instrument must have breadth and thickness, as well as length; and the instrument such as my trinometer is constructed so that its measuring parts are in fact lines lying upon one face or another of the several members of the instrument. For instance: In Figure 1 of the drawings the arms O, U, and T have length, breadth, and thickness; but for an understanding of the use of the instrument they may be assumed to be graduated straight lines pivoted together at a common point, (the graduated edges of the arms, produced, will pass through the pivot). For structural reasons the base-bar has breadth and thickness; and the protractors attached to the base-bar are mounted with their centers somewhat above it; principally to give a clear sight of the scales which register the positions of the protractors on the base-bar. But for an understanding of the use of the instrument, the base-bar may be considered to pass through the centers of these protractors, as the line DAB; and the points of intersection of the arms or lines O, U, and T with the base of the triangle under investigation, are the points of intersection of the said lines O, U, and T with the line DAB; which line passes through the axes of the protractors. So, geometrically speaking, the lines O, U, and T pass through the center of pivot C; and they also pass and slide through, and turn about, the centers of the protractors J, $J_1$, and $J_2$, which centers lie on, and are adjustable with reference to one another on, the line DAB; which line is the base of the triangle or triangles under investigation when the lines O, U, and T are the sides.

In the description of my instrument I have used the capital letters A, B, C, and D to designate the points of intersection of lines forming the triangle or triangles under investigation; as for instance the point A, the point of intersection between line U and line DAB (which is the line passing through the centers of mechanisms D, A, and B or through centers of protractors J, $J_2$, and $J_1$); the point B, the point of intersection between line T and the line DAB; the point C, the point of intersection between the three lines O, U, and T; the point D, the point of intersection between the line O and the line DAB. I have so designated these points because it is customary to so designate similar points in geometry. For the sake of simplifying the description I have also designated the assembled protractors and their parts as "mechanisms". For instance: the assembled protractor $J_1$ at the point B is designated as the mechanism B; the assembled protractor $J_2$ and its parts located at the point A is designated as the mechanism A. This method of designating the points of the triangles, and the mechanism assembled at these points, makes the description of the instrument shorter and more easily understandable by the reader.

Having described my invention, I claim:

1. In an instrument of the class described: a graduated base-bar; two protractors slidably mounted on the base-bar; a third protractor located to one side of the base-bar; two graduated arms pivoted together at one end and slidably mounted, one through the center of one of the base-bar protractors and the other through the center of the third protractor; a third graduated arm pivoted on the center of the third protractor and slidably mounted on the center of the other base-bar protractor; the three arms and the base-bar forming a quadrilateral figure.

2. In an instrument of the class described: a graduated base-bar; two protractors slidably mounted on one side of the base-bar; a third protractor slidably mounted on the other side of the base-bar; a fourth protractor located to one side of the base-bar; three graduated arms pivoted together at one end and slidably mounted, one through the center of one of the protractors on the front of the base-bar, another through the center of the protractor on the rear of the base-bar, and the third through the center of the free protractor; a fourth graduated arm pivoted on the center of the fourth protractor and slidably mounted through the center of the second protractor on the front of the base-bar.

3. In an instrument of the class described: a graduated base-bar; a plurality of protractors slidably mounted upon the base-bar; an added protractor to one side of the base-bar; a plurality of graduated arms pivoted together at one end, and one of them slidably mounted through the center of the added protractor and the others slidably mounted through the centers of the protractors on the base-bar, respectively; and a protractor arranged at the pivot for measuring the angular relations between the pivoted graduated arms.

In testimony whereof I have hereunto affixed my signature.

JOSEPH EUGENE ROWE.